3,414,563
CERTAIN 3H-1,4-BENZODIAZEPIN-2(1H)-ONES
Rudolf G. Griot, Florham Park, N.J., assignor to
Sandoz Inc., Hanover, N.J.
No Drawing. Continuation-in-part of application Ser. No.
392,905, Aug. 28, 1964. This application Mar. 25, 1966,
Ser. No. 537,276
4 Claims. (Cl. 260—239.3)

ABSTRACT OF THE DISCLOSURE

This invention is directed to compounds of the formula:

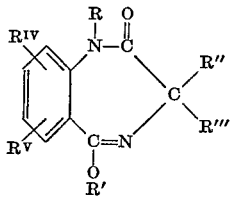

wherein

R represents lower alkyl
R' represents lower alkyl
R'' represents hydrogen or lower alkyl
R''' represents hydrogen, lower alkyl or phenyl; and
each of $R^{IV}$ and $R^{V}$, independently, represents hydrogen, halo, lower alkyl, lower alkoxy, loweralkylthio, or loweralkylsulfonyl These compounds are useful as tranquilizers.

---

This application is a continuation-in-part of my co-pending application, Serial No. 392,905, filed August 28, 1964, now abandoned.

This invention relates to benzodiazepinones. In particular, the invention relates to benzodiazepinones which are represented by the following structural formula:

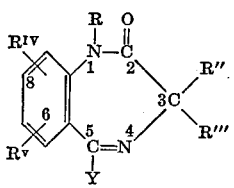

wherein

R is loweralkyl, preferably containing 1 to 4 carbon atoms, e.g., methyl, ethyl, propyl or butyl;
Y is —NH₂; —NR°R'; OR'; —SR'; or a saturated monocyclic ring

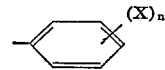

containing in the ring, in addition to the nitrogen atom, from 2 to 7 carbon atoms or from 3 to 5 carbon atoms and one additional hetero atom of the group nitrogen, oxygen and sulfur, e.g., alklenimino, such as ethylenimino, piperidino or heptamethylenimino, morpholino, thiomorpholino and N-(N'-loweralkyl)piperazinyl such as N-(N'-methyl)piperazinyl;

R' is loweralkyl, preferably containing 1 to 4 carbon atoms, e.g. methyl, ethyl, propyl or butyl; allyl; propargyl; diloweralkylaminoethyl, each of the loweralkyl groups thereof preferably containing 1 to 4 carbon atoms, e.g., β-dimethylaminoethyl; diloweralkylaminopropyl, each of the loweralkyl groups thereof preferably containing 1 to 4 carbon atoms, e.g., γ-dimethylaminopropyl; benzyl; substituted benzyl of the formula

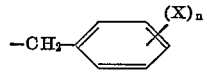

where X is halogen, preferably chlorine or bromine, loweralkoxy, preferably containing 1 to 3 carbon atoms or loweralkylthio, preferably containing 1 to 3 carbon atoms, and n is a whole number of from 1 to 3, inclusive, e.g., 2,4-dichlorobenzyl, p-bromobenzyl, 3,5-dimethoxybenzyl and 3-chloro-2-ethylthiobenzyl; 4-(1-loweralkyl)piperidyl, the loweralkyl group preferably containing 1 to 4 carbon atoms, e.g., 4-(1-methyl)-piperidyl; 3-(1-loweralkyl)-piperidyl, the loweralkyl group preferably containing 1 to 4 carbon atoms, e.g., 3-(1-ethyl)-piperidyl; 2-(1-loweralkyl)-piperidyl, the lower alkyl group preferably containing 1 to 4 carbon atoms, e.g, 2-(1-propyl)-piperidyl; pyridyl, e.g., α-pyridyl, β-pyridyl and γ-pyridyl; phenyl; substituted phenyl of the formula

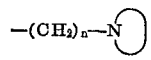

wherein X and n are defined above, e.g., 2,3,5-trichlorophenyl, 2-bromo-4-ethoxyphenyl and 3-methylthiophenyl; ω-trifluoromethyl-loweralkyl, the loweralkyl group preferably containing from 1 to 4 carbon atoms, e.g., trifluoromethylethyl; tri(chloromethyl)methyl; or the group $$-(CH_2)_n-N\bigcirc$$

wherein n and

are as defined above, e.g., γ-morpholinopropyl, β-piperidinoethyl, β-thiomorpholinoethyl, and γ-(1-methyl-4-piperazinyl)propyl;
R° is hydrogen or loweralkyl, preferably containing from 1 to 4 carbon atoms, e.g., methyl, ethyl, propyl and butyl;
R'' is hydrogen or loweralkyl, preferably containing from 1 to 4 carbon atoms, e.g. methyl, ethyl, propyl and butyl;
R''' is hydrogen; loweralkyl, preferably containing from 1 to 4 carbon atoms, e.g., methyl, ethyl, propyl and butyl; or phenyl; provided that when R'' and R''' are both alkyl they may be linked together to form a homocyclic ring containing from 5 to 6 carbon atoms therein;
$R^{IV}$ and $R^{V}$ are the same or different and represent hydrogen; halogen, preferably chlorine or bromine; loweralkyl, preferably containing 1 to 4 carbon atoms, e.g., methyl, ethyl, propyl and butyl; loweralkoxy, preferably containing 1 to 4 carbon atoms, e.g., methoxy, ethoxy, propoxy and butoxy; loweralkylthio, preferably containing from 1 to 4 carbon atoms, e.g., methylthio, ethylthio and propylthio; or loweralkylsulfonyl, preferably containing from 1 to 4 carbon atoms, e.g., methylsulfonyl and ethylsulfonyl.

The process for preparing the compounds of structural Formula I may be represented by the following reaction scheme:

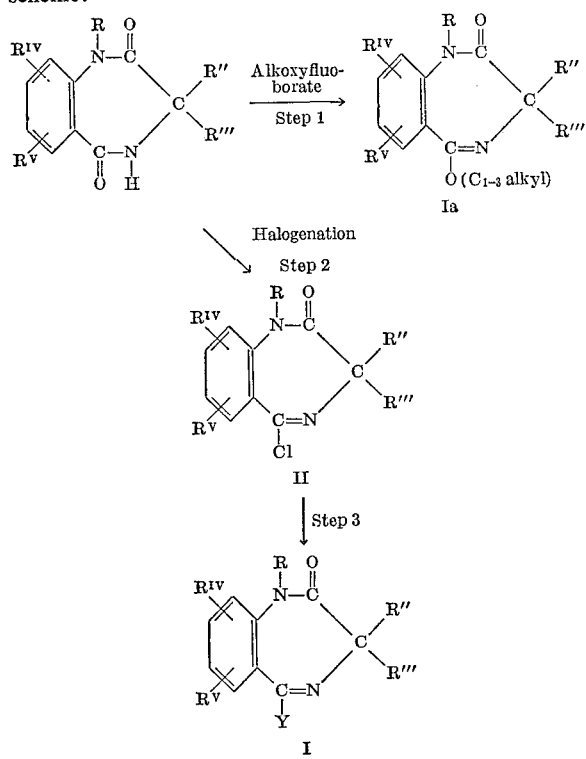

wherein R, R", R"', $R^{IV}$, $R^V$, and Y are as defined above.

As illustrated above, the compounds of Formula I can be prepared by chlorinating 3H-1,4-diazepine-2,5-(1H,4H)-dione or an appropriately substituted derivative thereof to form the corresponding 5-chloro-3H-1,4-diazepine-2-(1H)-one (II) (Step 2). The chlorination is carried out in conventional manner employing a suitable chlorinating agent for this purpose. Suitable agents include phosphorus pentachloride, and the like.

The resulting product (II) is then converted to the desired product of Formula I where Y is $NH_2$, —NR°R' or

and R°, R' and the nitrogen containing ring

are as defined above, by treatment with ammonia or an appropriate amine, or where Y is —OR' or —SR' and R' is as previously defined, by treatment with an appropriate alcoholate or thioalcoholate (Step 3). The conversion effected by Step 3 is readily accomplished in conventional manner employing conditions generally utilized for carrying out the same. The desired products are readily recovered employing conventional techniques.

The compounds of Formula I, wherein Y is specifically limited to an alkoxy group containing from 1 to 3 carbon atoms (Ia), can additionally be prepared by reacting the 3H-1,4-diazepine-2,5-(1H,4H)-dione or an appropriately substituted derivative thereof with a trialkoxyfluoborate, e.g., trimethoxyfluoborate, triethoxyfluoborate or tripropoxyfluoborate. This reaction is carried out in conventional manner employing such conditions as are generally applicable for carrying out reactions of this nature. The resulting 5-alkoxy derivative is readily recovered in conventional manner. The starting compounds, namely the 3H-1,4-diazepine-2,5-(1H,4H)-dione or appropriately substituted derivatives thereof are either known compounds which can be prepared as described in the literature or compounds which can be prepared in analogous manner. Thus, for example, the starting compounds may be prepared by reacting in known manner an appropriately substituted 3,1(4H)-benzoxazine-2,4(1H)-dione with methanol to form the corresponding anthranilic acid methyl ester, reacting the latter in known manner with an appropriately substituted bromoacetylbromide or chloroacetylchloride to form the corresponding substituted anthranilic acid methyl ester and treating the latter with ammonia gas. This process may be illustrated as follows:

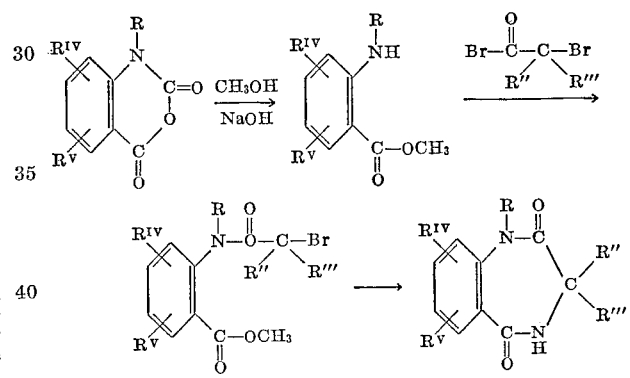

wherein R, R", R"', $R^{IV}$ and $R^V$ are as herein defined.

The preceding process is suitable for the preparation of all of the starting compounds employed herein except those which are substituted at the 9- position of the benzene moiety. These latter compounds may be prepared following the procedure described in the J. Medicinal Chem. vol. 9, pp. 6–10 (January 1966). The process set forth therein as well as other processes heretofore described in the literature may also be employed for preparing the starting compounds employed herein.

Representative compounds which can be made in the manner set forth above and are included within the scope of this invention are set forth in tabular form below. For convenience only, the compounds are identified by setting forth the significance of the various groups represented in structural Formula I. However, it is to be understood that the designation of the compounds in this manner is merely in lieu of setting forth the chemical name thereof.

| Compound | R | R" | R"' | $R^{IV}$ | $R^V$ | Y |
|---|---|---|---|---|---|---|
| 1 | methyl | H | H | H | 7-chloro | —$NH_2$ |
| 2 | methyl | H | H | H | 7-chloro | —$NHCH_3$ |
| 3 | methyl | H | H | H | 7-chloro | —N(C₂H₅)(CH₃) |
| 4 | propyl | H | H | H | 7-chloro | —$NHCH_2CH=CH_2$ |

| Compound | R | R'' | R''' | R^IV | R^V | Y |
|---|---|---|---|---|---|---|
| 5 | methyl | H | H | H | 7-chloro | $-N(C_2H_5)(CH_2C{\equiv}CH)$ |
| 6 | butyl | H | H | H | 7-chloro | $-NHCH_2CH_2N(CH_3)_2$ |
| 7 | methyl | H | H | H | 7-chloro | $-N(CH_3)-N(CH_3)(C_2H_5)$ connected via $-(CH_2)_3-$ |
| 8 | ethyl | H | H | H | 7-chloro | $-NHCH_2{-}C_6H_5$ |
| 9 | methyl | H | H | H | 7-chloro | $-N(CH_3)-(2,4,5{-}trichlorophenyl)$ |
| 10 | isopropyl | H | H | H | 7-chloro | $-N(CH_3)-(3{-}pyridyl)$ |
| 11 | methyl | H | H | H | 7-chloro | $-NH-(3{-}pyridyl)$ |
| 12 | methyl | H | H | H | 7-chloro | $-N(CH_3)-(2{-}pyridyl)$ |
| 13 | methyl | H | H | H | 7-chloro | $-NH-(1{-}methylpiperidin{-}4{-}yl)$ |
| 14 | ethyl | H | H | H | 7-chloro | $-NH-(1{-}methylpiperidin{-}4{-}yl)$ |
| 15 | methyl | H | H | | 7-chloro | $-NH-(1{-}methylpiperidin{-}2{-}yl)$ |
| 16 | propyl | H | H | H | 7-chloro | $-N(CH_3)-C_6H_5$ |
| 17 | methyl | H | H | H | 7-chloro | $-NH-(3,4{-}dimethoxyphenyl)$ |
| 18 | isopropyl | H | H | H | 7-chloro | $-OCH_3$ |
| 19 | methyl | H | H | H | 7-chloro | $-OC_2H_5$ |
| 20 | butyl | H | H | H | 7-chloro | $-OCH(CH_3)_2$ |
| 21 | methyl | H | H | H | 7-chloro | $-OC_4H_9$ |
| 22 | methyl | H | H | H | 7-chloro | $-OCH_2CH_2N(CH_3)(C_2H_5)$ |

| Compound | R | R'' | R''' | R^IV | R^V | Y |
|---|---|---|---|---|---|---|
| 23 | methyl | H | H | H | 7-chloro | —O(CH$_2$)$_3$N(C$_2$H$_5$)$_2$ |
| 24 | ethyl | H | H | H | 7-chloro | —OCH$_2$CH=CH$_2$ |
| 25 | methyl | H | H | H | 7-chloro | —OCH$_2$C≡CH |
| 26 | methyl | H | H | H | 7-chloro | —OCH$_2$CF$_3$ |
| 27 | methyl | H | H | H | 7-chloro | —OCH$_2$CH$_2$CF$_3$ |
| 28 | ethyl | H | H | H | 7-chloro | —O(CH$_2$)$_3$CF$_3$ |
| 29 | methyl | H | H | H | 7-chloro | —OC(CH$_2$Cl)$_3$ |
| 30 | methyl | H | H | H | 7-chloro | —O-(2,5-dibromo-4-(methylthio)phenyl) |
| 31 | methyl | H | H | H | 7-chloro | —O-phenyl |
| 32 | ethyl | H | H | H | 7-chloro | —O-(2,4,5-trichlorophenyl) |
| 33 | methyl | H | H | H | 7-chloro | —SCH$_3$ |
| 34 | methyl | H | H | H | 7-chloro | —SC$_3$H$_7$ |
| 35 | methyl | H | H | H | 7-chloro | —S(CH$_2$)$_2$N(CH$_3$)$_2$ |
| 36 | ethyl | H | H | H | 7-chloro | —S(CH$_2$)$_3$—N(C$_2$H$_5$)$_2$ |
| 37 | methyl | H | H | H | 7-chloro | —S(CH$_2$)$_2$N(CH$_3$)(C$_2$H$_5$) |
| 38 | methyl | H | H | H | 7-chloro | —S(CH$_2$)$_3$—N(CH$_3$)(C$_2$H$_5$) |
| 39 | methyl | H | H | H | 7-chloro | —S-phenyl |
| 40 | ethyl | H | H | H | 7-chloro | —S-(4-(ethylthio)phenyl) |
| 41 | methyl | H | H | H | 7-chloro | —S-(2-methoxy-4,5-dichlorophenyl) |
| 42 | methyl | H | H | H | 7-chloro | —S-(4-bromophenyl) |
| 43 | methyl | H | H | H | 7-chloro | —N(aziridinyl) |
| 44 | methyl | H | H | H | 7-chloro | —N(azetidinyl) |
| 45 | methyl | H | H | H | 7-chloro | —N(pyrrolidinyl) |
| 46 | ethyl | H | H | H | 7-chloro | —N(piperidinyl) |
| 47 | methyl | H | H | H | 7-chloro | —N(hexamethyleneimino) |
| 48 | methyl | H | H | H | 7-chloro | —N(piperidinyl) |
| 49 | methyl | H | H | H | 7-chloro | —N(4-methylpiperazinyl) |
| 50 | ethyl | H | H | H | 7-chloro | —N(4-butylpiperazinyl) |
| 51 | methyl | H | H | H | 7-chloro | —N(morpholinyl) |
| 52 | methyl | H | H | H | 7-chloro | —N(thiomorpholinyl) |

| Compound | R | R'' | R''' | R$^{IV}$ | R$^V$ | Y |
|---|---|---|---|---|---|---|
| 53 | methyl | H | H | H | H | —NH$_2$ |
| 54 | methyl | H | H | H | H | —NHCH$_3$ |
| 55 | methyl | H | H | H | H | —N(CH$_3$)$_2$ |
| 56 | methyl | H | H | H | H | —NH—C$_6$H$_5$ |
| 57 | methyl | H | H | H | H | —NHCH$_2$CH$_2$N(CH$_3$)$_2$ |
| 58 | methyl | H | H | H | H | —NHCH$_2$—C$_6$H$_5$ |
| 59 | methyl | H | H | H | H | —OCH$_3$ |
| 60 | methyl | H | H | H | H | —OC$_4$H$_9$ |
| 61 | methyl | H | H | H | H | —O(CH$_2$)$_3$N(CH$_3$)$_2$ |
| 62 | methyl | H | H | H | H | —O—C$_6$H$_5$ |
| 63 | methyl | H | H | H | H | —OCH$_2$—C$_6$H$_5$ |
| 64 | methyl | H | H | H | H | —SC$_2$H$_5$ |
| 65 | methyl | H | H | H | H | —S—(CH$_2$)$_2$N(CH$_3$)$_2$ |
| 66 | methyl | H | H | H | H | —S—C$_6$H$_5$ |
| 67 | methyl | H | H | H | H | —SCH$_2$—C$_6$H$_5$ |
| 68 | methyl | H | H | H | H | —N(pyrrolidinyl) |
| 69 | methyl | H | H | H | H | —N(N'-methylpiperazinyl) |
| 70 | methyl | H | H | H | H | —NH(CH$_2$)$_3$—N(morpholinyl) |
| 71 | methyl | H | H | H | H | —O(CH$_2$)$_2$—N(piperidinyl) |
| 72 | methyl | H | H | H | H | —S(CH$_2$)$_2$—N(N'-methylpiperazinyl) |
| 73 | methyl | H | H | H | H | —NH(CH$_2$)$_2$—N(pyrrolidinyl) |
| 74 | methyl | H | H | H | H | —NH(CH$_2$)$_2$—N(thiomorpholinyl) |
| 75 | methyl | methyl | H | 7-chloro | 8-chloro | —NHCH$_3$ |
| 76 | methyl | H | phenyl | 7-methyl | H | —N(CH$_3$)(C$_2$H$_5$) |
| 77 | ethyl | H | methyl | 7-methylthio | H | —NHCH$_2$—C$_6$H$_5$ |
| 78 | methyl | H | ethyl | 7-methyl | 8-methyl | —NH—C$_6$H$_5$ |
| 79 | methyl | H | H | 7-methoxy | H | —N(piperidinyl) |
| 80 | methyl | H | methyl | 7-methylsulfonyl | H | —OCH$_3$ |
| 81 | methyl | methyl | methyl | 7-methoxy | H | —OCH$_2$CH$_2$N(CH$_3$)$_2$ |
| 82 | ethyl | H | H | 6-chloro | H | —O—C$_6$H$_5$ |
| 83 | methyl | H | methyl | 7-chloro | 8-methoxy | —O—CH$_2$—C$_6$H$_5$ |
| 84 | methyl | H | phenyl | 7-methoxy | 8-methoxy | —SCH$_3$ |
| 85 | methyl | methyl | ethyl | 7-chloro | H | —S—C$_6$H$_5$ |
| 86 | methyl | methyl | phenyl | 7-chloro | H | —S—C$_6$H$_5$ |

| Compound | R | R'' | R''' | R^IV | R^V | Y |
|---|---|---|---|---|---|---|
| 87 | methyl | H | H | 7-chloro | 8-methyl | —S(CH$_2$)$_3$N(CH$_3$)$_2$ |
| 88 | ethyl | H | methyl | 7-chloro | 9-chloro | —N⟨⟩N—CH$_3$ |
| 89 | methyl | H | ethyl | 7-bromo | H | —NH(CH$_2$)$_3$—N⟨⟩O |
| 90 | methyl | methyl | methyl | 7-bromo | 9-bromo | —N(CH$_3$)(CH$_2$)$_3$N(CH$_3$)$_2$ |
| 91 | methyl | H | H | 7-methyl | 8-methylsulfonyl | —O(CH$_2$)$_2$—N⟨⟩ |
| 92 | methyl | H | methyl | 6-methyl | 8-methylthio | —S(CH$_2$)$_2$—N⟨⟩N—CH$_3$ |
| 93 | methyl | H | H | H | 7-ethoxy | —N⟨ |
| 94 | methyl | methyl | methyl | H | H | —N⟨ |
| 95 | methyl | methyl | methyl | 6-methyl | 7-chloro | —SCH$_3$ |
| 96 | methyl | methyl | phenyl | 7-bromo | 8-methyl | —OC$_2$H$_5$ |
| 97 | methyl | methyl | methyl | 7-chloro | H | —NHCH$_2$CH=CH$_2$ |
| 98 | methyl | methyl | methyl | 7-chloro | 8-chloro | —N(CH$_3$)—C$_6$H$_5$ |
| 99 | methyl | ethyl | ethyl | 7-chloro | H | —NHC$_2$H$_5$ |

The compounds of structural Formula I are useful because they possess pharmacological activity. In particular, all of the compounds possess central nervous system activity and therefore can be used as tranquilizers or antidepressants depending on whether they depress or stimulate the central nervous system. Thus, for example, compounds of the type of Example 9 depress the central nervous system and are useful as tranquilizers whereas compounds of the type of Examples 1, 5 and 7 stimulate the nervous system and therefore find application as antidepressants. The determination as to whether a particular compound is a tranquilizer or antidepressant can be readily established by standard test procedures with minimal effort.

For the above uses the compounds may be combined with a pharmaceutically acceptable carrier, and such other conventional adjuvants as may be necessary and administered orally in such forms as tablets, capsules, elixirs, suspensions, solutions and the like or parenterally in the form of an injectable solution or suspension. The compounds may be administered in their free base form or in the form of a pharmaceutically acceptable acid addition salt thereof. Such salts possess the same order of activity as the free base, are readily prepared by reacting the base with the appropriate acid in conventional manner and accordingly are included within the scope of this invention. Representative of such salts are the mineral acid salts such as the hydrochloride, hydrobromide, phosphate, sulfate and the like and the organic acid salts such as the fumarate salicylate, succinate, maleate, methanesulfonate and the like. The dosage employed will, of course, vary depending upon the compound used, the therapy desired and the mode of administration. However, in general satisfactory results are achieved when administered at a daily dosage of from about 15 to about 30 mg.

A representative formulation is a tablet prepared by standard tabletting techniques and containing the following ingredients:

| Ingredient: | Parts by weight |
|---|---|
| 7-chloro-5-ethoxy-1-methyl-3H-1,4-benzodiazepin-2-(1H)-one (or pharmaceutically acceptable salt thereof) | ¹15 |
| Tragacanth | 2 |
| Lactose | 74.5 |
| Corn Starch | 5 |
| Talcum | 3 |
| Magnesium Stearate | 0.5 |

¹ Calculated as free base.

The following examples show representative compounds encompassed within the scope of this invention and the manner in which such compounds are prepared. However, it is to be understood that the examples are for purposes of illustration only and are not intended as in any way limiting the scope of the invention which is defined in the appended claims.

In the examples which follow all temperatures are in degrees centigrade and the parts and percentages are by weight unless otherwise specified.

Example 1.—7-chloro-1-methyl-5-(3-dimethylaminopropylamino)-3H-1,4-benzodiazepin-2(1H)-one

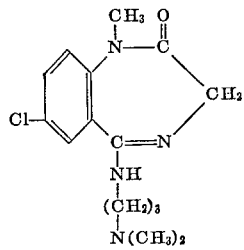

A. Preparation of 5-chloro-N-bromoacetyl-N-methylanthranilic acid methyl ester.—Cool to 0° C. a solution of 0.02 mole of 5-chloro-N-methylanthranilic acid methyl ester in 100 parts by volume of dichloromethane. To the solution add 0.025 mole of bromoacetylbromide in 40 parts by volume of dichloromethane. While maintaining the temperature of the resulting mixture at from 0° C. to 5° C., add dropwise thereto 0.03 mole of pyridine in 15 parts by volume of dichloromethane. After stirring for one-half hour at 0°–5° C., extract the mixture with 2 N hydrochloric acid, then with water and then with aqueous sodium bicarbonate solution. Dry the organic phase and evaporate the solvent therefrom to obtain 5-chloro-N-bromoacetyl-N-methylanthranilic acid methyl ester as a colorless oil, B.P. 151° to 153° C./0.05 mm. Allow the oil to stand at 0° C. for 19 hours to obtain crystalline material, M.P. 58°–59° C.

B. Preparation of 7-chloro-1-methyl-3H-1,4-benzodiazepin-2,5-(1H,4H)-dione.—Dissolve 4.4 parts of 5-chloro-N-bromoacetyl-N-methylanthranilic acid methyl ester in 100 parts by volume of methanol. Saturate the resulting solution (while stirring and cooling to 10° C.) for two hours with ammonia gas. Strip off the solvent and dissolve the residue in a minimum of chloroform. Wash the resulting solution first with 2 N hydrochloric acid, then with water and then with aqueous sodium bicarbonate solution. Dry the chloroform solution and evaporate the solvent therefrom to obtain the product. Recrystallize from methanol to obtain 7-chloro-1-methyl-3H-1,4-benzodiazepine-2,5(1H,4H)-dione, M.P. 178° to 179° C.

C. Preparation of 5,7-dichloro - 1 - methyl-3H-1,4-benzodiazepin-2-(1H)-one hydrochloride.—Dissolve 1.14 parts (0.005 mole) of phosphorus pentachloride in 50 parts by volume of carbon tetrachloride. Add dropwise to the resulting solution a solution of 1.125 parts (0.005 mole) of 7-chloro-1-methyl-3H-1,4-benzodiazepin-2,5(1H,4H)-dione in 5 parts by volume of chloroform and 20 parts by volume of carbon tetrachloride. The product crystallizes out. Reflux for 15 minutes to complete the reaction before filtering the suspension. Wash the solids with carbon tetrachloride and dry for 2 hours at 40° C. to obtain 5,7-dichloro-1-methyl-3H - 1,4 - benzodiazepin - 2 (1H)-one hydrochloride, M.P. 70°–80° C. (dec.).

D. Preparation of 7-chloro-1-methyl-5-(3-dimethylaminopropylamino)-3H-1,4 - benzodiazepin-2(1H)-one.— Dissolve 11.0 parts of N,N-dimethyl-1,3-diaminopropane in 75 parts by volume of dichloromethane and cool the resulting solution to 0° C. To this solution (while stirring and maintaining the temperature at from 0° to 5° C.) add a solution of 10 parts of 5,7-dichloro-1-methyl-3H-1,4-benzodiazepin-2-(1H)-one hydrochloride in 250 parts by volume of dichloromethane. Permit the resulting solution to warm to room temperature (20° C.), maintain at that temperature over night (17 hours) and then strip off the solvent. Dissolve the residue in chloroform, wash the chloroform solution with aqueous sodium bicarbonate solution, dry the washed solution over sodium sulphate and evaporate the solvent to obtain 7-chloro-1-methyl-5(3-dimethylaminopropylamino) - 3H - 1,4 - benzodiazepin-2(1H)-one.

To obtain the dihydrochloride salt thereof, wash the free base several times with petroleum ether and add to the washed residue an ethanolic solution of hydrogen chloride (containing two molar equivalents of hydrogen chloride). Recrystallize from methanol to obtain the dihydrochloride, M.P. 268° C. (dec.).

Example 2

Following the procedure of Step D of Example 1 and employing an equivalent amount of the ractants enumerated below in place of the N-N-dimethyl-1,3-diamino-propane used therein there are obtained the products set forth below.

| Reactant: | Product |
|---|---|
| Propargylamine | 7-chloro-1-methyl-5-(propargylamino)-3H-1,4-benzodiazepin-2(1H)-one. |
| Allylamine | 7-chloro-1-methyl-5-(allylamino)-3H-1,4-benzodiazepin-2(1H)-one. |
| Benzylamine | 7-chloro-1-methyl-5-(benzylamino)-3H-1,4-benzodiazepin-2(1H)-one. |
| p-Chlorobenzylamine | 7-chloro-1-methyl-5-(p-chlorobenzylamino)-3H-1,4-benzodiazepin-2(1H)-one. |
| 3,5-dimethoxybenzylamine | 7-chloro-1-methyl-5-(3,5-dimethoxybenzylamino)-3H-1,4-benzodiazepin-2(1H)-one. |
| 4-amino-1-methylpiperidine | 7-chloro-1-methyl-5-(1-methyl-4-piperidyl)amino-3H-1,4-benzodiazepin-2(1H)-one. |
| 2-aminopyridine | 7-chloro-1-methyl-5-(2-pyridylamino)-3H-1,4-benzodiazepin-2(1H)-one. |
| p-Chloroaniline | 7-chloro-1-methyl-5-(p-chlorophenylamino)-3H-1,4-benzodiazepin-2(1H)-one. |
| Ethylbenzylamine | 7-chloro-1-methyl-5-(N-methyl-N-benzylamino)-3H-1,4-benzodiazepin-2(1H)-one. |

Example 3.—7-chloro-5-(γ-morpholinopropylamino)-1-methyl-3H-1,4-benzodiazepin-2(1H)-one

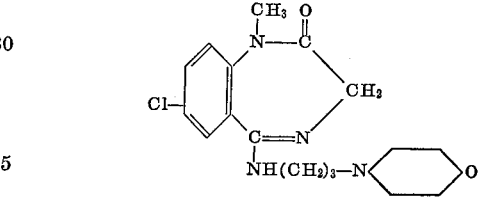

Add a solution of 2.4 parts of phosphorous pentachloride in 100 parts by volume of dichloromethane to a solution of 2.24 parts of 7-chloro-1-methyl-3H-1,4-benzodiazepin-2,5(1H,4H)-dione in 50 parts by volume of dichloromethane and maintain the resulting mixture at 20° C. for two hours. Remove the phosphorous oxychloride generated and solvent by heating in vacuo at a temperature of from 30 to 40° C. Dissolve the residue in 20 parts by volume of dichloromethane and add the resulting solution dropwise to a solution of 2.0 parts of γ-aminopropylmorpholine in 50 parts by volume of dichloromethane while cooling in a Dry Ice/acetone bath. Maintain the mixture at room temperature over night (17 hours), then pour it into ice water containing 5 parts of sodium bicarbonate and separate the resulting layers. Chromatograph the organic layer containing the crude base on a silica gel column using chloroform as the solvent to obtain 7-chloro-5-(γ-morpholinopropylamino)-1-methyl-3H-1,4-benzodiazepin-2(1H)-one.

To obtain the dihydrochloride salt thereof, dissolve the free base in isopropanol, neutralize with an isopropanol solution of hydrogen chloride and cool. Recrystallize from ethanol-diethylether to obtain the dihydrochloride, M.P. 275° C. (dec.).

Example 4

Following the procedure of Example 3 and employing an equivalent amount of the reactants enumerated below in place of the γ-aminopropylmorpholine used therein there are obtained the products listed below.

| Reactant: | Product |
|---|---|
| 1-(β-aminoethyl) piperidine | 7-chloro-5-(β-piperidinoethylamino)-1-methyl-3H-1,4-benzodiazepin-2(1H)-one. |
| 1-(β-aminoethyl) thiomorpholine | 7-chloro-5-(β-thiomorpholinoethylamino)-1-methyl-3H-1,4-benzodiazepin-2(1H)-one. |

1-(γ-aminopropyl)-
4-methylpiper-
azine _____ 7-chloro-5-[γ-(1-methyl-4-
piperazinyl)-propylamino]-1-
methyl-3H-1,4-benzodiazepin-
2(1H)-one.

Example 5.—7-chloro-1-methyl-5-(N-methylanilino)-
3H-1,4-benzodiazepin-2(1H)-one

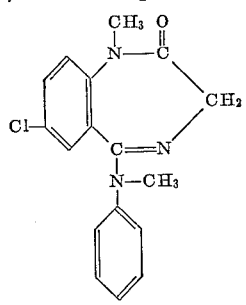

Dissolve 26.0 parts of N-methylaniline in 150 parts by volume of dichloromethane and cool the solution to 0° C. While stirring and maintaining the temperature at from 0° to 5° C. add a solution of 10 parts of 5,7-dichloro-1-methyl - 3H - 1,4-benzodiazepin-2(1H)-one hydrochloride in 250 parts by volume of dichloromethane. Allow the resulting solution to warm to room temperature, maintain at that temperature over night and then strip off the solvent. Dissolve the residue in chloroform, wash the chloroform solution with aqueous sodium bicarbonate solution, dry the solution over sodium sulfate and evaporate the solvent to obtain 7-chloro-1-methyl-5-(N-methylanilino)-3H-1,4-benzodiazepin-2(1H)-one.

To obtain the hydrochloride salt thereof wash the base several times with petroleum ether and neutralize with an ethanolic solution of hydrogen chloride. Recrystallize from methanol to obtain the hydrochloride, M.P. 273°–275° C.

Example 6

Following the procedure of Example 5 and employing an equivalent amount of the reactants enumerated below for the N-methylaniline used therein there are obtained the products listed below.

Reactant: | Product
---|---
3,5-dimethoxy-benzylamine | 7-chloro-1-methyl-5-(3,5-dimethoxybenzylamino)-3H-1,4-benzodiazepin-2(1H)-one.
N-methylallylamine | 7-chloro-1-methyl-5-(N-methylallylamino)-3H-1,4-benzodiazepin-2(1H)-one.
p-Methoxyaniline | 7-chloro-1-methyl-5-(p-methoxyphenylamino)-3H-1,4-benzodiazepin-2(1H)-one.
3-methylthioaniline | 7-chloro-1-methyl-5-[3-(methylthio)phenylamino]-3H-1,4-benzodiazepin-2(1H)-one.

Example 7.—7-chloro-1-methyl-5-(N-methylpiperazino)-
3H-1,4-benzodiazepin-2(1H)-one

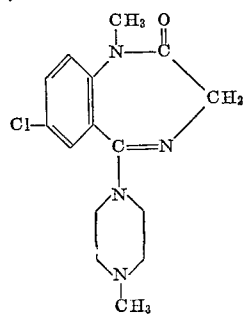

Dissolve 11.0 parts of N-methylpiperazine in 75 parts by volume of dichloroethane and cool the resulting solution to 0° C. To the cooled solution (while stirring and maintaining the temperature at 0°–5° C.- add a solution of 10 parts of 5,7-dichloro-1-methyl-3H-1,4-benzodiazepin-2(1H))-one hydrochloride in 250 parts by volume of dichloromethane. Allow the resulting solution to warm to room temperature, maintain at room temperature over night and then strip off the solvent. Dissolve the residue in chloroform, wash the chloroform solution with aqueous sodium becarbonate solution, dry the washed solution over sodium sulphate and evaporate the solvent to obtain 7-chloro-1-methyl - 5 - (N-methylpiperazinyl)-3H-1,4-benzodiazepin-2(1H)-one, M.P. 171° C.

Example 8

Following the procedure of Example 7 and employing an equivalent amount of the reactants enumerated below in place of N-methylpiperazine there are obtained the products listed below.

Reactant: | Product
---|---
Imidazoline | 7-chloro-1-methyl-5-(1-imidazolidinyl)-3H-1,4-benzodiazepin-2(1H)-one.
Pyrazolidine | 7-chloro-1-methyl-5-(1-pyrazolidinyl)-3H-1,4-benzodiazepin-2(1H)-one.
Thiamorpholine | 7-chloro-1-methyl-5-(thiomorpholino)-3H-1,4-benzodiazepin-2(1H)-one.
Morpholine | 7-chloro-1-methyl-5-(morpholino)-3H-1,4-benzodiazepin-2(1H)-one.

Example 9.—7-chloro-5-ethoxy-1-methyl-3H-1,4-benzodiazepin-2(1H)-one

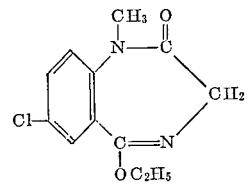

Prepare triethoxyfluoborate in known manner [H. Meerwein, J. Prakt. Chem. 154, 83 (1939)] from 5.0 parts of boron trifluoride etherate (47%) and 2.5 parts of epichlorohydrin. Dissolve the fluoborate in 50 parts by volume of chloroform. Cool the solution to 0° C. and then add thereto a solution of 5.57 parts of 7-chloro-1-methyl-3H-1,4-benzodiazepin-2,5(1H,4H)-dione in 100 parts by volume of chloroform. Maintain the resulting mixture over night at room temperature and then add 10 parts by volume of 50% aqueous potassium carbonate solution. Separate the organic phase, dry the same over potassium carbonate and evaporate the solvent to obtain crystalline 7-chloro-5-ethoxy-1-methyl-3H-1,4 - benzodiazepin-2 (1H)-one, M.P. 123.5°–124.5° C.

Example 10.—7-chloro-5-methoxy-1-methyl-3H-1,4-benzodiazepin-2(1H)-one

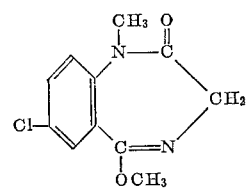

Following the procedure of Example 9 and employing an equivalent amount of trimethoxyfluoborate (prepared in known manner) in place of the triethoxyfluoborate used therein there is obtained the product 7-chloro- 5-methoxy-1-methyl-3H-1,4 - benzodiazepin - 2(1H)-one, M.P. 114–115.5° C.

Example 11.—7-chloro-5-ethoxy-1-ethyl-3H-1,4-benzodiazepin-2(1H)-one

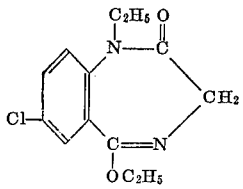

A. Preparation of 5-chloro-N-bromoacetyl-N-ethylanthranilic acid methyl ester.—Following the procedure of Example 1, Step A, and employing an equivalent amount of 5-chloro-N-ethylanthranilic acid methyl ester in place of the 5-chloro-N-methylanthranilic acid methyl ester used therein there is obtained the product 5-chloro-N-bromoacetyl-N-ethylanthranilic acid methyl ester, B.P. 130° C/0.01 mm.

B. Preparation of 7-chloro-1-chloro-1-ethyl - 3H-1,4-benzodiazepin-2,5-(1H,4H)-dione.—Following the procedure of Example 1, Step B, and employing an equivalent amount of 5-chloro-N-bromoacetyl-N - ethylanthranilic acid methyl ester in place of the 5-chloro-N-bromoacetyl-N-methylanthranilic acid methyl ester used therein there is obtained the product 7-chloro-1-ethyl-3H-1,4-benzodiazepin-2,5-(1H,4H)-dione, M.P. 146–147° C.

C. Preparation of 7-chloro-5 - ethoxy-1-ethyl-3H-1,4-benzodiazepin-2(1H)-one.—Following the procedure of Example 9 and employing an equivalent amount of 7-chloro-1-ethyl-3H-1,4-benzodiazepin - 2,5-(1H,4H)-dione in place of the 7-chloro-1-methyl-3H-1,4-benzodiazepin-2,5-(1H,4H)-dione used therein there is obtained the product 7-chloro-5-ethoxy-1-ethyl-3H-1,4-benzodiazepin-2(1H)-one, M.P. 91–93° C.

Example 12.—7-chloro-1-methyl-5-thiophenyl-3H-1,4-benzodiazepin-2(1H)-one

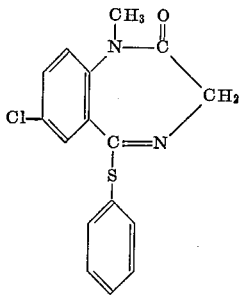

Reflux gently for 2 hours 2.24 parts of 7-chloro-1-methyl-3H-1,4-benzodiazepin-2,5-(1H,4H)-dione with a solution of 2.4 parts of phosphorous pentachloride in 100 parts by volume of dichloromethane. Evaporate in vacuo the phosphorous oxychloride generated and the solvent. Dissolve the residue in 50 parts by volume of dichloromethane. Under an atmosphere of nitrogen add the resulting solution slowly to a solution of 0.5 part of sodium in 2 parts by volume of thiophenol and 50 parts by volume of dry tetrahydrofuran (cooled to −70° C. in a Dry Ice/acetone bath). Maintain the resulting mixture under a nitrogen atmosphere at room temperature over night, then pour into ice water and then extract the resulting mixture with dichloromethane. Chromatograph the resulting crude product on a silica gel using chloroform as a solvent to obtain crystalline 7-chloro-1-methyl-5-thiophenyl-3H-1,4-benzodiazepin-2(1H)-one (middle fraction). Recrystallize from methanol to obtain product, M.P. 147° C.

Example 13

Following the procedure of Example 12 and employing the reactants enumerated below in place of the thiophenol used therein there are obtained the products listed below.

| Reactant: | Product |
|---|---|
| Methylmercaptan | 7-chloro-1-methyl-5-methylthio-3H-1,4-benzodiazepin-2(1H)-one. |
| 2-propyn-1-thiol | 7-chloro-1-methyl-5-propargylthio-3H-1,4-benzodiazepin-2(1H)-one. |
| 2-propen-1-thiol | 7-chloro-1-methyl-5-allylthio-3H-1,4-benzodiazepin-2(1H)-one. |
| Benzylmercaptan | 7-chloro-1-methyl-5-benzylthio-3H-1,4-benzodiazepin-2(1H)-one. |

Example 14.—7-chloro-5-ethylenimino-1-methyl-3H-1,4-benzodiazepin-2(1H)-one

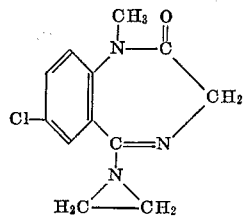

Add a solution of 2.4 parts of phosphorous pentachloride in 100 parts by volume of dichloromethane to a solution of 2.24 parts of 7-chloro-1-methyl-3H-1,4-benzodiazepin-2,5(1H,4H)-dione in 50 parts by volume of dichloromethane and maintain the resulting mixture at 20° C. for two hours. Remove the phosphorous oxychloride generated and the solvent in vacuo at a temperature of from 30° to 40° C. Dissolve the residue in 20 parts by volume of dichloromethane and add the resulting solution dropwise to a solution of 2.0 parts of ethylenimine in 50 parts by volume of dichloromethane while cooling in a Dry Ice/acetone bath. Maintain the mixture at room temperature over night (17 hrs.) and then pour it into ice water containing 5 parts of sodium bicarbonate. Separate the organic layer and distil off therefrom the excess ethylenimine in vacuo to obtain 7-chloro-5-ethylenimino-1-methyl - 3H - 1,4-benzodiazepin-2(1H)-one.

To obtain the hemifumarate salt thereof, neutralize the free base with an ethanolic solution of fumaric acid. Recrystallize from ethanol to obtain the hemifumarate, M.P. 224.5°–225.0° C. (dec.).

Example 15

Following the procedure of Example 14 and employing an equivalent amount of the reactants enumerated below in place of the ethylenimine used therein there are obtained the products listed below.

| Reactant: | Product |
|---|---|
| Trimethylenimine | 7-chloro-5-trimethylenimino-1-methyl-3H-1,4-benzodiazepin-2(1H)-one. |
| Pyrrolidine | 7-chloro-1-methyl-5-(1-pyrrolidinyl)-3H-1,4-benzodiazepin-2(1H)-one. |
| Piperidine | 7-chloro-1-methyl-5-piperidino-3H-1,4-benzodiazepin-2(1H)-one. |
| Hexamethylenimine | 7-chloro-1-methyl-5-hexamethylenimino-3H-1,4-benzodiazepin-2(1H)-one. |
| Heptamethylenimine | 7-chloro-1-methyl-5-heptamethylenimino-3H-1,4-benzodiazepin-2(1H)-one. |

What is claimed is:
1. A compound of the formula

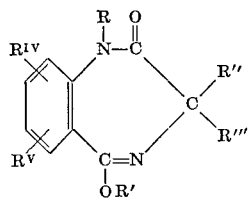

wherein
R represents lower alkyl;
R' represents lower alkyl;
R" represents hydrogen or lower alkyl;
R'" represents hydrogen, lower alkyl or phenyl; and
each of $R^{IV}$ and $R^V$, independently, represents hydrogen, halo, lower alkyl, lower alkoxy, lower alkylthio, or lower alkylsulfonyl.

2. The compound of claim 1 which is 7-chloro-5-ethoxy-1-methyl-3H-1,4-benzodiazepin-2(1H)-one.
3. The compound of claim 1 which is 7-chloro-1-methyl-5-methoxy-3H-1,4-benzodiazepin-2(1H)-one.
4. The compound of claim 1 which is 7-chloro-1-ethyl-5-ethoxy-3H-1,4-benzodiazepin-2(1H)-one.

References Cited

UNITED STATES PATENTS 3,346,565  10/1967  Testa et al. _____ 260—239.3

HENRY R. JILES, *Primary Examiner.*
ROBERT T. BOND, *Assistant Examiner.*